United States Patent [19]

Chen et al.

[11] Patent Number: 5,488,597
[45] Date of Patent: Jan. 30, 1996

[54] MULTILAYER OPTICAL MEMORY WITH MEANS FOR RECORDING AND READING INFORMATION

[75] Inventors: Alan G. Chen, 129 White Oak Ct. #6, Schaumburg, Ill. 60195; David J. Brady, Champaign, Ill.

[73] Assignee: Alan G. Chen, Schaumburg, Ill.

[21] Appl. No.: 229,653

[22] Filed: Apr. 19, 1994

[51] Int. Cl.$^6$ ............................................. G11B 7/00
[52] U.S. Cl. ........................... 369/100; 369/94; 369/283
[58] Field of Search .................................. 369/100, 275.1, 369/275.2, 94, 283, 286, 288; 359/53, 95; 365/108

[56] References Cited

U.S. PATENT DOCUMENTS

| | | | |
|---|---|---|---|
| 4,288,861 | 9/1981 | Swainson et al. | 365/127 |
| 4,729,640 | 5/1988 | Sakata | 350/348 |
| 4,908,813 | 3/1990 | Ojima | 369/94 |
| 5,045,373 | 9/1991 | Sens | 369/288 |
| 5,059,473 | 10/1991 | Takahashi | 369/288 |
| 5,079,061 | 1/1992 | Hashida | 369/288 |
| 5,187,703 | 2/1993 | Katayama et al. | 369/275.1 |
| 5,243,455 | 9/1993 | Johnson | 359/93 |
| 5,255,262 | 10/1993 | Best et al. | 369/275.1 |
| 5,353,247 | 10/1994 | Faris | 365/108 |

FOREIGN PATENT DOCUMENTS 147506  12/1978  Japan ..................... 369/94

OTHER PUBLICATIONS

Article by Dieter Pohl "Stacked Optical Memories" Feb. 1974/ vol. 13, No. 2/ Applied Optics, pp. 341–346.

Primary Examiner—Georgia Y. Epps
Assistant Examiner—Ricky Mack
Attorney, Agent, or Firm—Wood, Phillips, VanSanten, Clark & Mortimer

[57] ABSTRACT

A multilayer optical memory has interleaved optical recording media layers and control layers. In a transmissive system, the recording media layers are sensitive to the polarization (linear or circular) of a light beam. The control layers are polarization modulators. In a reflective system, the control layers are notch filters.

12 Claims, 2 Drawing Sheets

MULTILAYER OPTICAL MEMORY WITH MEANS FOR RECORDING AND READING INFORMATION

This invention relates to a multilayer optical memory of interleaved optical recording media layers and control layers.

BACKGROUND OF THE INVENTION

Multilayer optical memories of two general types have been proposed.

Pohl, Stacked Optical Memories, Applied Optics February 1974 discusses a memory comprising a stack of holographic plates on which information is written or recorded and read or accessed by time-gated signals.

Multilayer optical memories which are recorded or accessed by focused laser beams are described in each of the following:

Katayama et al 5,187,703

Best et al. 5,255,262.

Swainson et al. 4,288,861 proposes a volume or three-dimensional storage medium using multiphoton absorption effects.

SUMMARY OF THE INVENTION

The present invention represents a different approach to a multilayer optical memory. Control layers interact with a light beam to record or read information on an associated recording media layer. In one embodiment, the control layer is a polarization modulator and the recording media layer is sensitive to polarization of the light beam. In another embodiment, the control layer is a notch filter which reflects light of a selected wavelength to the associated recording media layer.

More particularly, the recording media may be sensitive to linear or circular polarization of a light beam. Alternatively, the recording media layers may be subject to magneto- or electro-optical excitation.

In one form of the invention, the control layer is an active polarization modulator, as a liquid crystal, which controls polarization of the light passing in accordance with an applied electrical field. In another embodiment of the invention, the control layer is a reflective notch filter, used with a tunable light source to reflect light to a selected recording media layer.

In a specific embodiment of the invention, information is recorded by embossed pits in the recording media layers. In one form of the invention the pits are filled with a liquid crystal material which is subject to an electric field to control polarization. In a second form of the invention, the pits are formed in the reflective surface of a notch filter.

BRIEF DESCRIPTION OF THE DRAWINGS

Further features and advantages of the invention will readily be apparent from the following specification and from the drawings in which.

DESCRIPTION OF THE PREFERRED EMBODIMENTS

Figure 1:
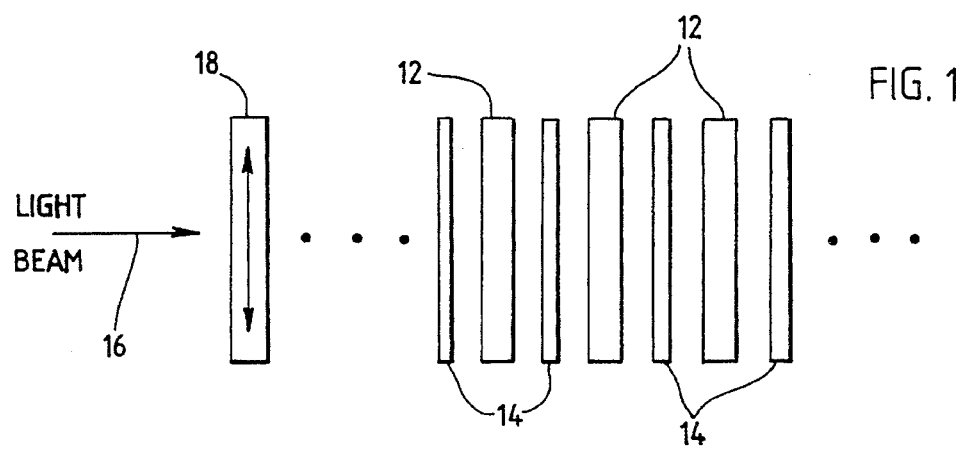
FIG. 1 is a diagram of a multilayer optical memory.

The multilayer memory is illustrated in the drawings in diagrammatic form. Several specific materials for the recording media and control layers will be described.

Memory 10, comprises an assembly of a plurality of interleaved optical recording media layers 12 and control layers 14. A light beam, indicated by the arrow 16, as from a laser, is directed through a polarizer 18 to scan the memory assembly. Polarizer 18 establishes an initial polarized condition for the light beam. The control layers 14 determine which of the recording layers 12 are subject to interaction with the light beam 16. For example, in a transmissive memory, the light beam passes through a control layer 14 before it reaches the associated recording media layer. In a specific example to be discussed below, the control layer establishes a polarization condition of the light beam for interaction with the adjacent recording media layer. Conversely, in a reflective system, the light beam passes through a recording media layer and is then selectively reflected by an adjacent control layer. The memory is preferably in disc form and rotated by suitable means (not shown) for the light beam to focus on appropriate areas, as shown in Best et al., supra.

The memory 10 has multiple interleaved layers of recording media 12 and control 14. Three or four layers are shown in the drawings. One hundred or more layers of both recording media and control may be used, depending on the requirements of the memory, noise resulting from scattering and the cost and complexity of constructing a multilayer device.

Figure 2:
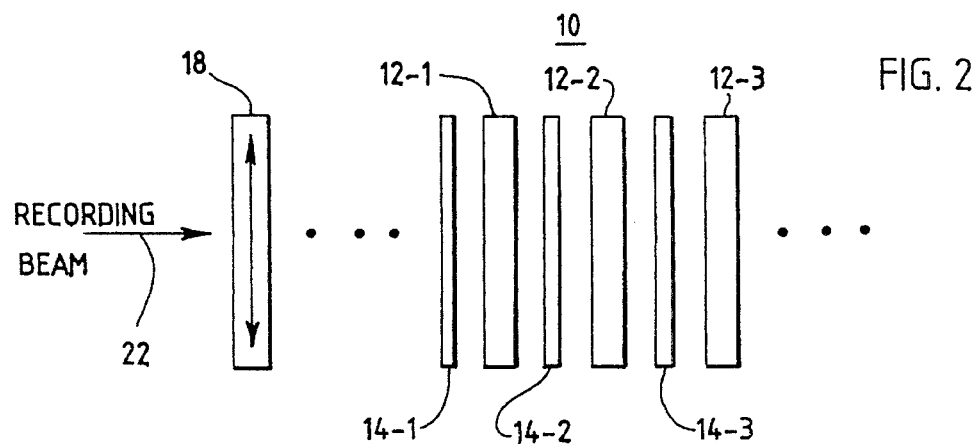
FIG. 2 is a diagram of a multilayer optical memory in a recording or writing mode.

A recording beam 22, FIG. 2, is directed through polarizer 18 to memory 10. Polarizer 18 establishes the initial polarized condition of the beam. In a transmissive system, control layer 14 conditions the light beam to interact with the next adjacent recording media layer 12. More specifically, a characteristic of the light beam is established by a control layer 14-1 before the light beam reaches the next adjacent layer 12-1 of recording media. Modulation of the light beam is recorded on recording layer 12-1. The subsequent control layer 14-2 conditions the light beam not to interact with recording media layer 12-2. Similarly control layers 14-2 and 14-3 are actuated to condition the light beam to interact with memory layers 12-2 and 12-3, respectively. A control layer typically establishes interaction of the light beam with the recording media layer by polarizing the light beam to match the physical characteristics of the media layer.

In a reflective system, each of the control layers 14 reflects a different wavelength of light. The light beam 22 varies in wavelength and is directed to one or another of the memory layers 12. For example, in FIG. 2, control layer 14-2 has a surface coating which reflects light at a wavelength λ2 to memory layer 12-1. Similarly, control layer 14-3 reflects light of a wavelength λ3 to memory layer 12-2. Modulation of the reflected light beam records information on the selected memory layer.

The transmissive and reflective memory systems of FIG. 2 are useful in high density optical data storage, dynamic hologram displays, and optical interconnect systems. The memory layers 12 are polarization-sensitive. For example, a linear polarization layer may have nematic liquid crystals in a polymeric carrier or azo-dye doped polyvinyl alcohol. Photo-induced birefringence, due to photoisomerization is observed in these materials. The control layers 14 are electrically-controlled liquid crystals which serve as dynamic waveplates. For a linear polarization-sensitive recording media, a liquid crystal layer which acts as a dynamic half waveplate is used. Alternatively, the storage media may be sensitive to circular polarization. Appropriate materials include cholesteric liquid crystalline materials, optically-active materials doped with racemic dyes or polymer-dispersed cholesteric liquid crystals. In this form of the memory, the liquid crystal control layers 14 are quarter waveplates. Data can be recorded by actuating the control layers, as described below, as the light beam 22 is modulated with the data.

Figure 3:
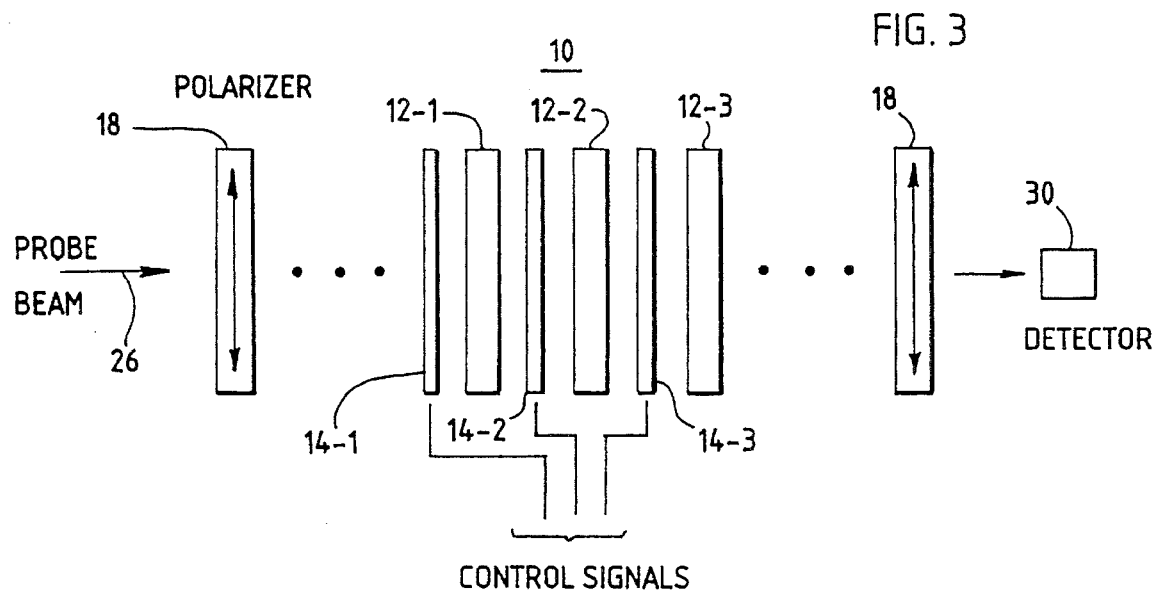
FIG. 3 is a diagram of a multilayer optical memory which transmits a light beam in a read mode of operation.

A transmissive memory 10 used in reading stored data is illustrated in FIG. 3. The memory comprises recording media layers 12-1, -2 and -3 interleaved with liquid crystal waveplate control layers 14-1, -2 and -3. A probe beam 26, as from a laser, is directed through polarizer 18 and then successively through the control and recording media layers. Each of the control layers is connected with a source of control signals. Application of control signals to the control layers establishes the effect of each control layer on the polarization of the light beam. For example, if data on recording media layer 12-2 is to be read by the probe beam, control layer 14-2 is actuated to establish polarization of the beam to interact with the recorded information. Control layer 14-3 is operated so that the probe beam does not interact with data on recording media layer 12-3. The modulated probe beam, after passing through all of the elements of memory 10, passes through polarizer 18 to detector 30.

Figure 4:
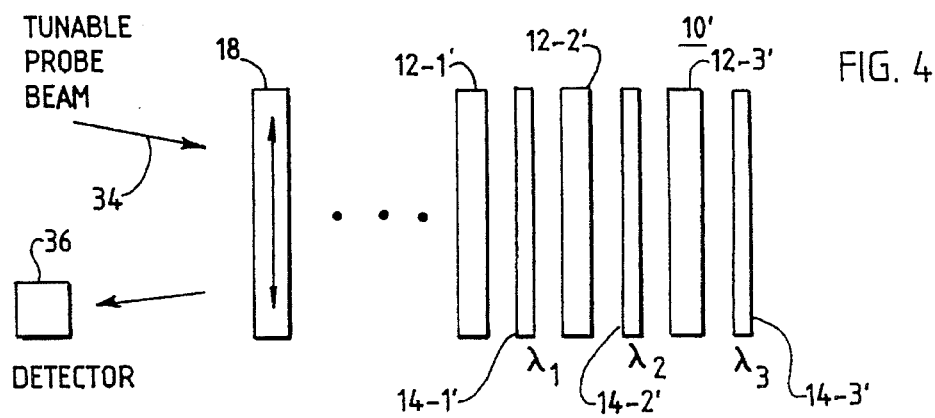
FIG. 4 is a diagram of a multilayer optical memory which reflects a light beam in read mode of operation.
Figure 5:
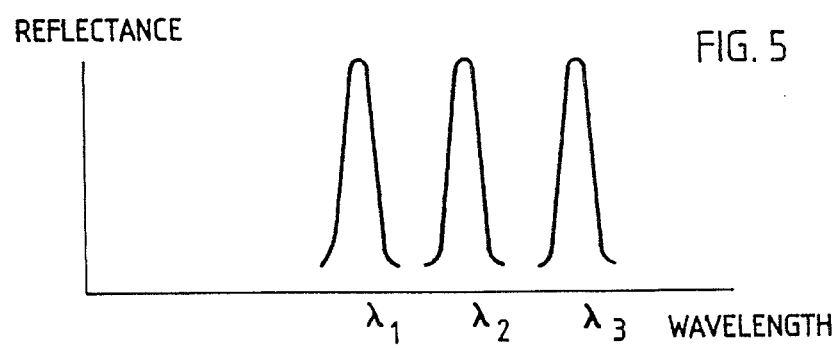
FIG. 5 is a plot of reflectance for the control layers of the memory of FIG. 4.

A reflective multi-element memory 10' used in reading recorded data is illustrated in FIG. 4. A tunable probe beam, arrow 34, is directed to the multi-element memory through polarizer 18. The control elements 14-1', 14-2' and 14-3' are interleaved with recording media layers 12-1', -2' and -3'. The control layers 14-1', -2' and -3' are notch filters having a reflectivity characteristic to reject a narrow band of frequencies. The reflectance characteristic of the control layers is illustrated in FIG. 5, where reflectance is plotted as a function of wavelength. Probe beam light having a wavelength $\lambda_1$ is reflected by control layer 14-1' through the recording media layer 12-1' and is modulated with data recorded on recording media layer 12-1'. The reflected modulated light signal is directed through polarizer 18 to detector 36. Similarly, data recorded on recording media layer 12-3' is read by light having a wavelength $\lambda_3$ which passes through control layers 14-1' and 14-2', but is reflected by layer 14-3', through recording media layer 12-3', polarizer 18 and to detector 36

Figure 6:
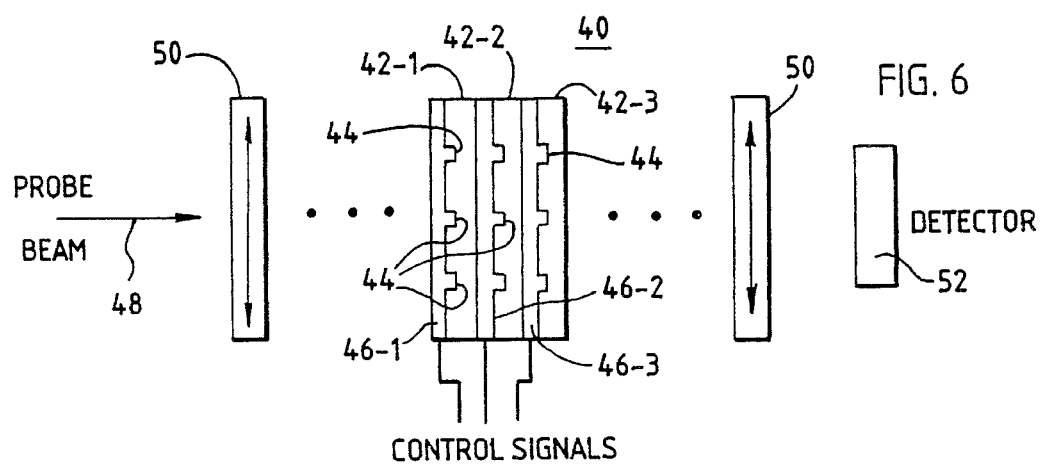
FIG. 6 is a diagram of a memory with recording media layers having embossed pits filled with liquid crystal.

A specific transmissive memory 40 is illustrated in FIG. 6. The optical recording media layers 42-1, 42-2 and 42-3 are embossed with pits 44 which record the stored information. Control layers 46-1, 46-2 and 46-3 are adjacent the associated recording media layers so that the liquid crystal material of the control layers fills the pits 44. Modulated probe beam 48 is directed through polarizer 50 to memory 40 and from the memory through a second polarizer 50 to detector 52.

Figure 7:
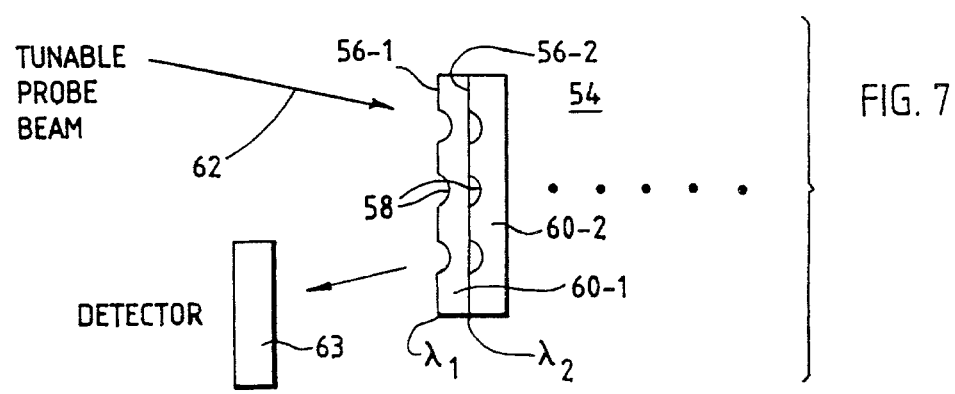
FIG. 7 is a diagram of memory having notch filter control layers with the recording media comprising embossed pits on the reflective surface of the filter.

A reflective system 54 in which the control layer notch filter is combined with the recording media layer is illustrated in FIG. 7. Reflective surfaces 56-1 and -2 reflect wavelengths $\lambda_1$ and $\lambda_2$, respectively. Embossed pits 58, in each surface, extend into the associated recording media layer 60-1 and 60-2. A tunable probe beam 62 is directed to memory 54. Light of the appropriate wavelengths is reflected from flat surfaces 56-1 and 56-2, representing digital 0. Light which strikes the pits 58 is scattered, representing digital 1. The reflected modulated information is received by detector 63.

We claim:

1. A multilayer optical memory, comprising:
   a plurality of stacked layers of optical recording media, sensitive to polarization of a light beam;
   a plurality of stacked control layers interleaved with said recording media layers to modulate polarization of a light beam; and
   a probe light beam which scans the layers of the memory, the probe light beam passing successively through alternate control and recording media layers, the polarization of the probe light beam being modified by a selected control layer for interaction with a selected recording media layer to write or read information thereon.

2. The multilayer optical memory of claim 1 in which said layers of recording media have planar surfaces sensitive to the polarization of the probe light beam.

3. The multilayer optical memory of claim 1 in which said control layers are electrically controlled liquid crystal waveplates.

4. The multilayer optical memory of claim 3 in which the recording media layers have embossed pits filled with liquid crystal material of adjacent control layers.

5. The multilayer optical memory of claim 1 in which said recording media layers are sensitive to linear polarized light.

6. The multilayer optical memory of claim 1 in which said memory transmits the probe light beam through successive control and recording media layers.

7. The multilayer optical memory of claim 6 including a signal detector for receiving the probe light beam modulated with information from one or more layers of said recording media.

8. The multilayer optical memory of claim 1 in which the recording media layers are read/writable.

9. The multilayer optical memory of claim 1 in which the recording media layers are read only.

10. The multilayer optical memory of claim 1 including a polarization layer between the probe light beam and the interleaved recording and control layers for establishing polarization of said probe light beam.

11. A multilayer optical memory, comprising:
    a plurality of stacked layers of optical recording media sensitive to a reflected light beam;
    a plurality of stacked reflective notch filter control layers interleaved with said layers of optical recording media; and
    a tunable probe light beam which scans the layers of the memory, the wavelength of the beam being chosen for reflection by one of the control layers to a selected layer of recording media.

12. A multilayer optical memory, comprising:
    a plurality of stacked recording media layers each having a reflective control surface, each reflective surface having a different wavelength characteristic;
    pits in the reflective surfaces, extending into the adjacent recording media layer; and
    a tunable probe light beam which scans said layers, the wavelength of the tunable probe beam being chosen for reflection by a selected surface to interact with the pits therein.

\* \* \* \* \*